US012636849B2

(12) United States Patent
Levert et al.

(10) Patent No.: US 12,636,849 B2
(45) Date of Patent: May 26, 2026

(54) MACHINE FOR JOINING SHEET MATERIAL, PREFERABLY CARDBOARD

(71) Applicant: GAZZELLA ATLANTIQUE, Avrille (FR)

(72) Inventors: Mathieu Levert, Vern d'Anjou (FR); Andréa Torcellan, Angers (FR)

(73) Assignee: GAZZELLA ATLANTIQUE, AVRILLE (FR)

( * ) Notice: Subject to any disclaimer, the term of this patent is extended or adjusted under 35 U.S.C. 154(b) by 0 days.

(21) Appl. No.: 18/835,593

(22) PCT Filed: Jan. 20, 2023

(86) PCT No.: PCT/FR2023/050079
§ 371 (c)(1),
(2) Date: Aug. 2, 2024

(87) PCT Pub. No.: WO2023/148440
PCT Pub. Date: Aug. 10, 2023

(65) Prior Publication Data

US 2025/0128490 A1 Apr. 24, 2025

(30) Foreign Application Priority Data

Feb. 3, 2022 (FR) ........................................ 2200959

(51) Int. Cl.
*B31B 50/62* (2017.01)
*B31B 50/04* (2017.01)
*B31B 50/72* (2017.01)

(52) U.S. Cl.
CPC .......... *B31B 50/624* (2017.08); *B31B 50/042* (2017.08); *B31B 50/726* (2017.08)

(58) Field of Classification Search
CPC ... B31B 50/624; B31B 50/042; B31B 50/726; B31B 50/684; B31B 2120/30; B31B 2120/302; B31B 2105/00
See application file for complete search history.

(56) References Cited

U.S. PATENT DOCUMENTS 2,969,719 A * 1/1961 Shenigo .................. B31B 50/00
493/131
4,604,083 A * 8/1986 Barny .................. B31B 50/006
493/34

(Continued)

FOREIGN PATENT DOCUMENTS

DE 22 39 335 2/1974

OTHER PUBLICATIONS

International Search Report dated Sep. 20, 2022.

*Primary Examiner* — Andrew M Tecco
*Assistant Examiner* — Nicholas E Igbokwe
(74) *Attorney, Agent, or Firm* — IPSILON USA, LLP

(57) ABSTRACT

A Machine (1) for joining sheet material (20) includes a sheet-material joining station (2) arranged between two sheet-material storage regions (3, 4), and a control unit (5). The joining station (2) forms a guide path (6) for sheet material (20) that develops longitudinally from one of the storage regions (3, 4) to the other storage region. The guide path (6) has two edges (7) and, arranged between the edges (7), at least one driver (8) and a unit (9) for joining sheet material (20), each joining unit (9) having at least one gluing and/or stapling device (10). Each driver (8) has at least one drive member (81) and each joining unit (9) is an activatable/deactivatable unit, each joining unit (9) being in the inactive state when the at least one drive member (81) is in the driven state in one of the directions of rotation thereof.

14 Claims, 10 Drawing Sheets

(56) References Cited

U.S. PATENT DOCUMENTS

| | | | | |
|---|---|---|---|---|
| 6,755,773 | B2 * | 6/2004 | Ospina | B31B 50/00 493/131 |
| 7,703,759 | B2 * | 4/2010 | Butler, Jr. | B65H 5/26 493/126 |
| 2001/0022427 | A1 * | 9/2001 | Ito | G07B 5/00 271/304 |
| 2003/0022776 | A1 * | 1/2003 | Butler | B31B 50/622 493/51 |
| 2016/0304305 | A1 * | 10/2016 | Link | H04N 1/00925 |

* cited by examiner

[Fig. 1]
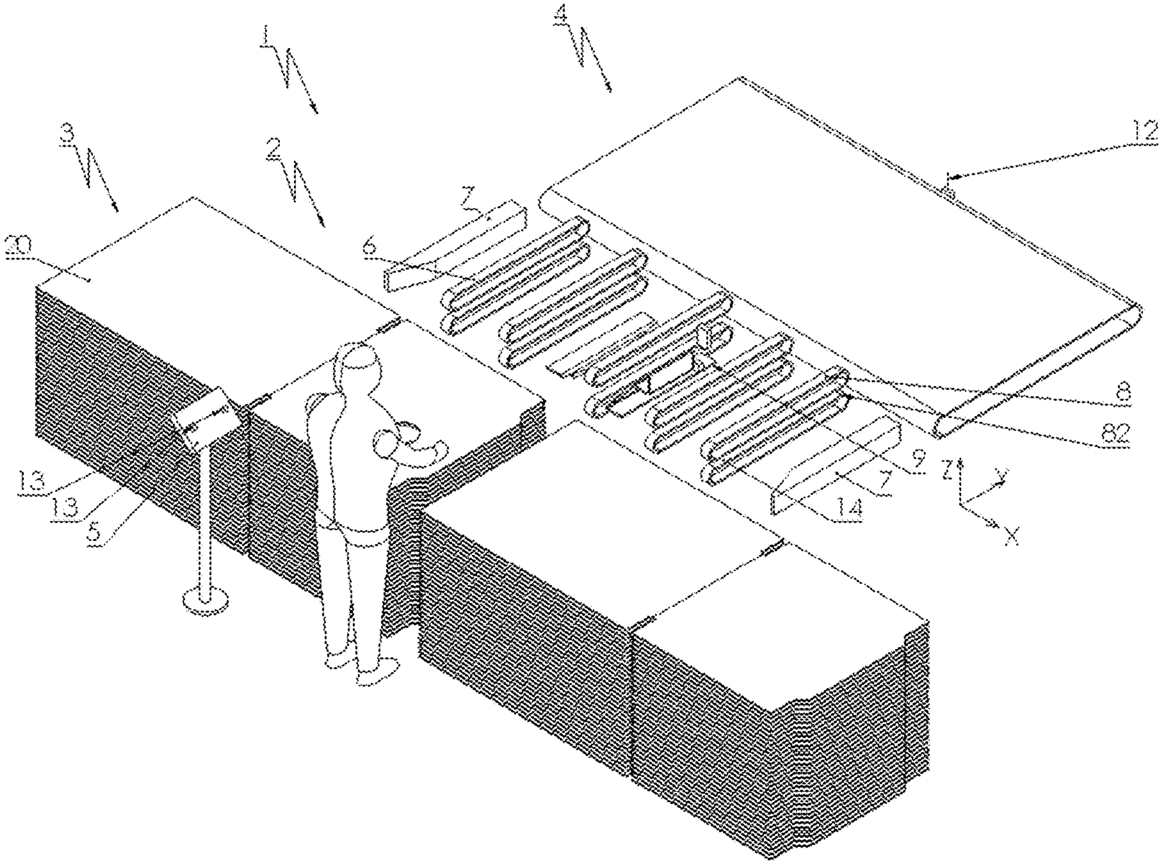

[Fig. 2]
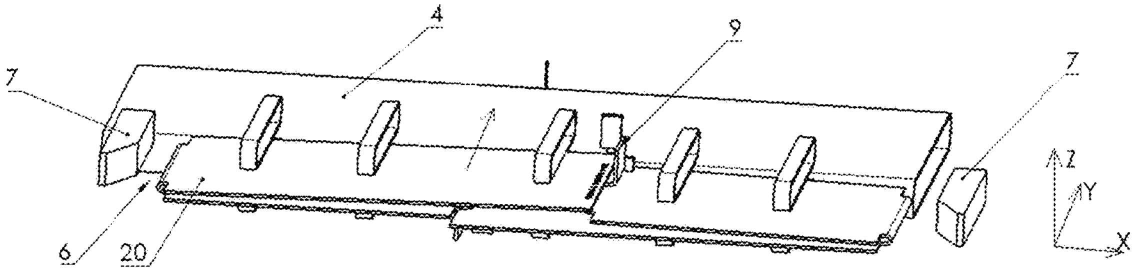

[Fig. 3]
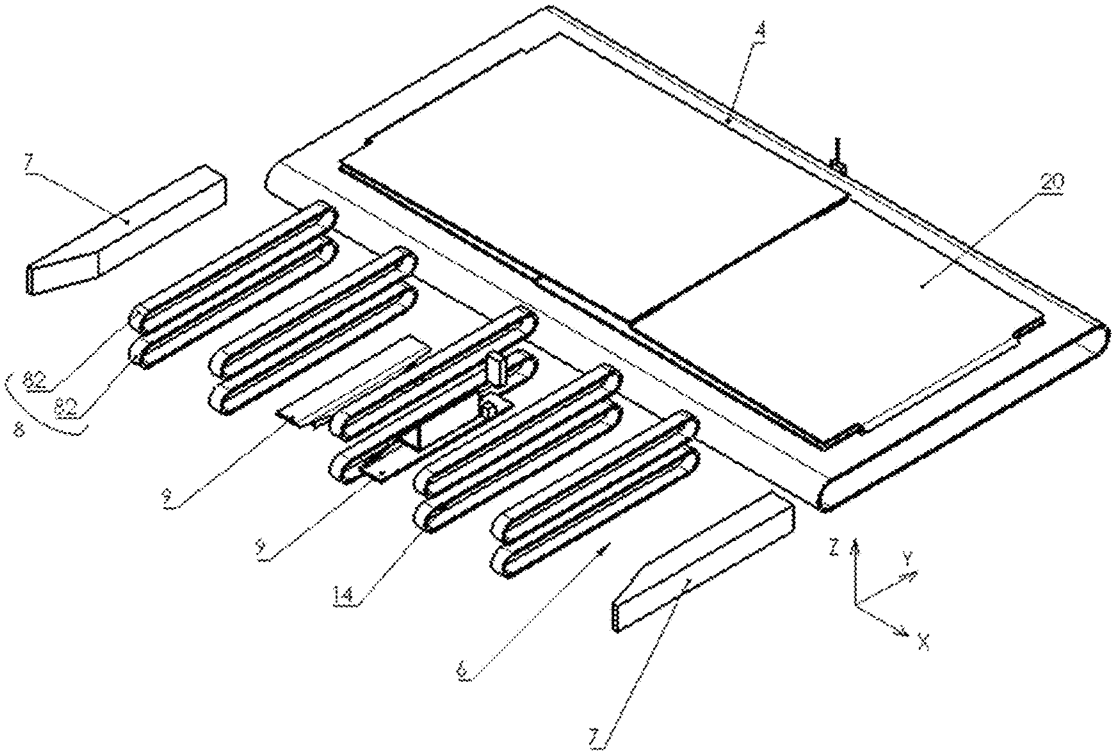

[Fig. 4]
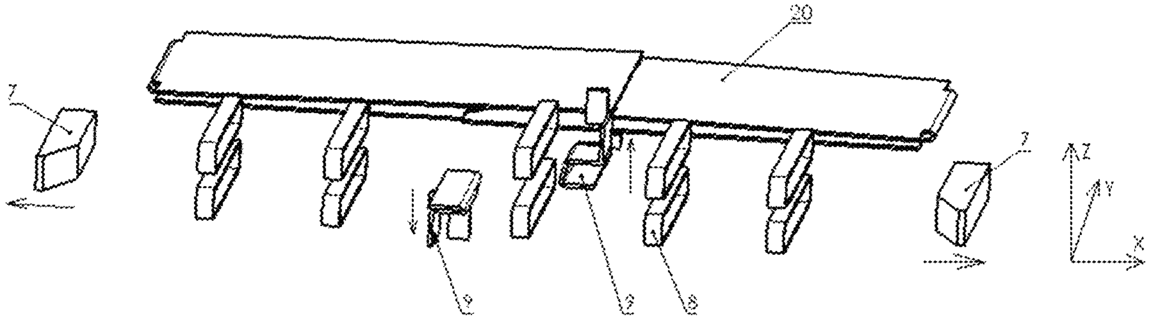

[Fig. 5]
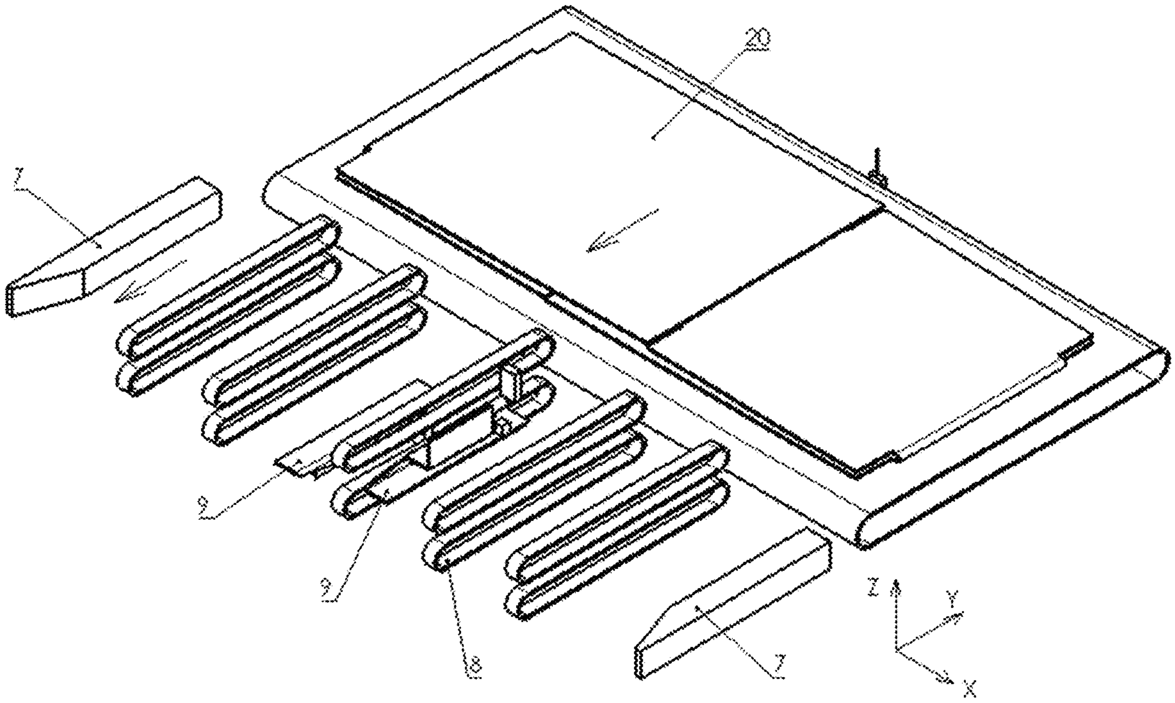

[Fig. 6]
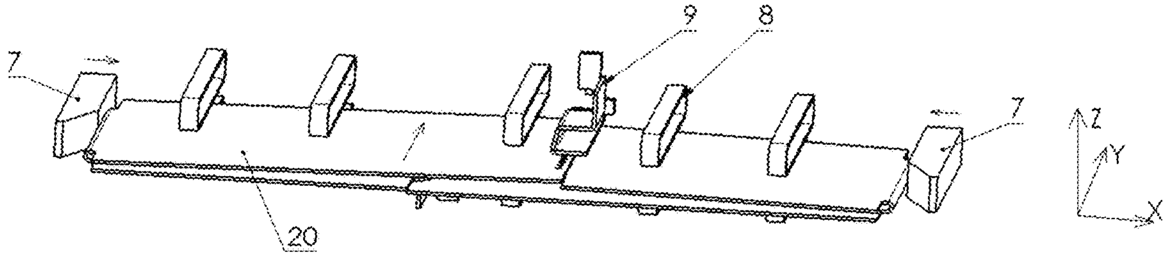

[Fig. 7]
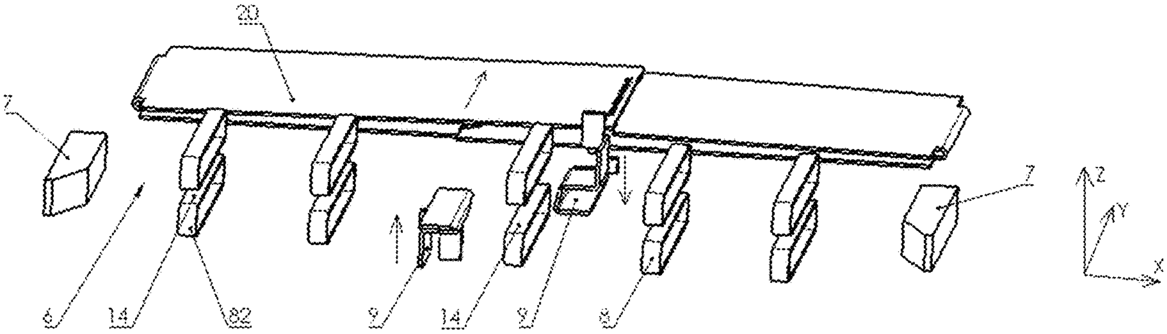

[Fig. 8]
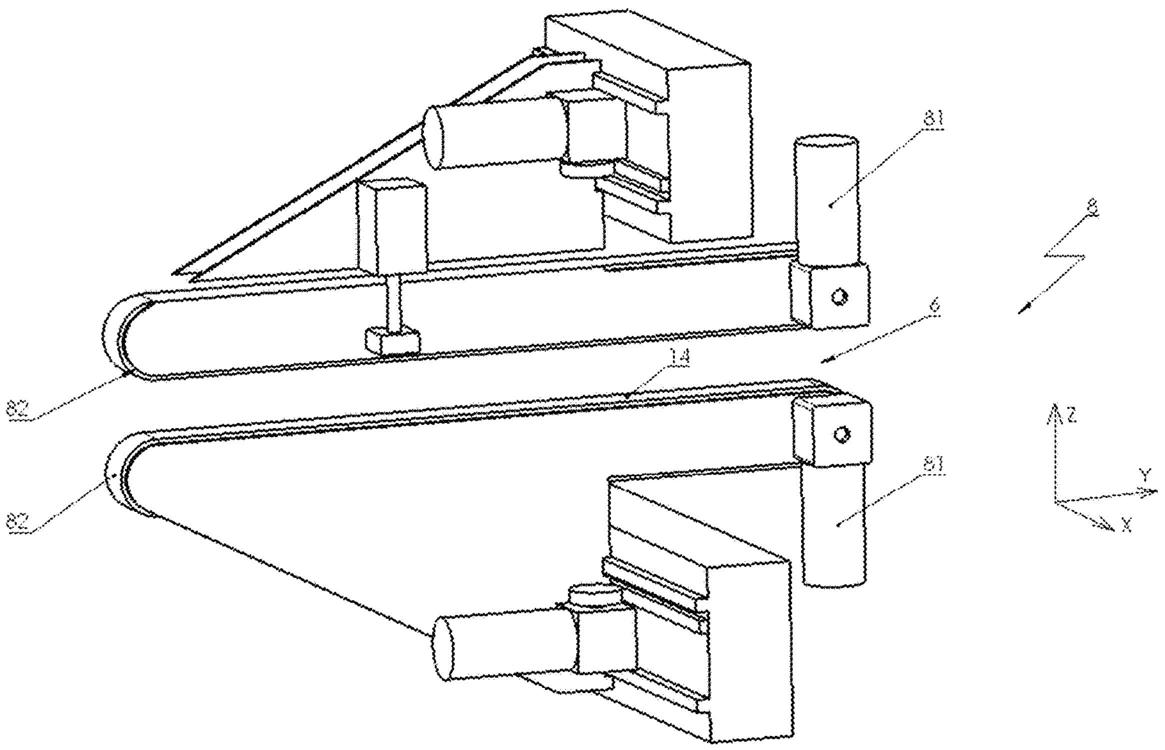

[Fig. 9]
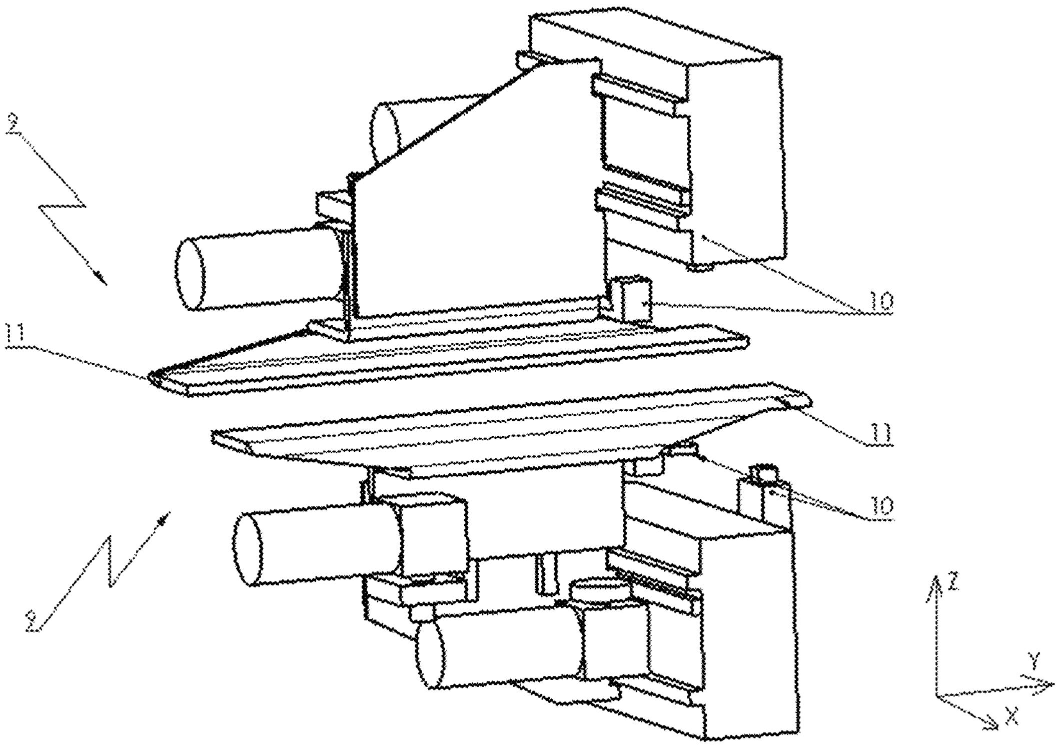

[Fig. 10]
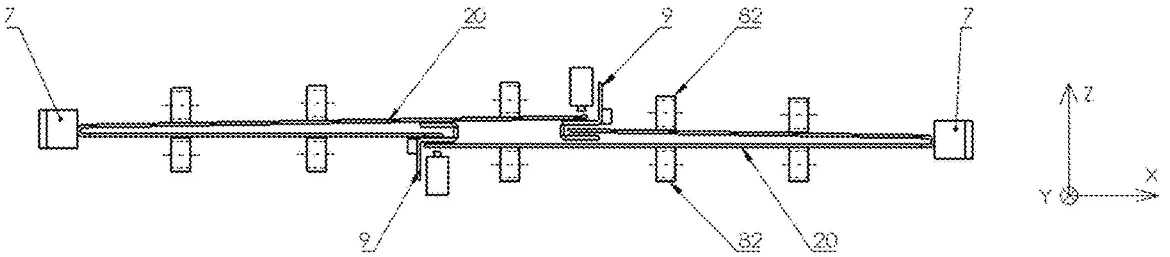

MACHINE FOR JOINING SHEET MATERIAL, PREFERABLY CARDBOARD

RELATED APPLICATION

This application is a National Phase of PCT/FR2023/050079 filed on Jan. 20, 2023, which claims priority to French Patent Application No. 22 00959, filed on Feb. 3, 2022, the entirety of which are incorporated by reference.

Field of the Invention

The present invention relates to a machine for joining sheet material, preferably cardboard.

It relates in particular to a machine for joining sheet material, preferably cardboard, said machine comprising a sheet material joining station, disposed between two sheet material storage zones, and a control unit, said joining station forming a guide path for sheet materials extending between the zones for storing sheet materials and extending longitudinally from one of the storage zones, referred to as first storage zone, to the other storage zone, referred to as second storage zone, said guide path comprising two lateral bounding means and, disposed between said lateral bounding means, at least one driver for said sheet materials and at least one unit for joining said sheet materials, each joining unit comprising at least one adhesive bonding and/or stapling device, each driver comprising at least one motor member.

Description of Related Art

A machine for joining sheet material is known, as illustrated in document US 2003/022776.

Such a machine makes it possible to join the edges of one and the same sheet material or to join two sheet materials so as to make it possible, for example, to produce the 4 side faces of the body of a parallelepipedal box. In these prior art machines, the first storage zone stores sheet materials which are to be joined or assembled, whereas the second storage zone stores sheet materials which have been joined or assembled. The operator visually inspects the join in the second storage zone to check that the join has been produced correctly. If the join is not correct, the operator initiates a new joining operation from the first storage zone after having adjusted the machine, if that is required. The fact is that the step of inspecting the join takes time and is tricky for the operator.

Objects and Summary

An aim of the invention is to provide a machine of the type mentioned above, the design of which makes it possible to save on time during the pre-adjustment of the machine before initiating a mass production.

To this end, the invention relates to a machine for joining sheet material, preferably cardboard, said machine comprising a sheet material joining station, disposed between two sheet material storage zones, and a control unit, said joining station forming a guide path for sheet material extending between the zones for storing sheet materials and extending longitudinally from one of the storage zones, referred to as first storage zone, to the other storage zone, referred to as second storage zone, said guide path comprising two lateral bounding means and, disposed between said lateral bounding means, at least one driver for sheet material and at least one unit for joining sheet material, each joining unit comprising at least one adhesive bonding and/or stapling device, each driver comprising at least one motor member, characterized in that the motor member or at least one of the motor members of the driver or of at least one of the drivers is a bidirectional motor member for moving the one or more sheet materials from one of the storage zones toward the other storage zone and vice versa, and in that the or each joining unit is an activatable/deactivatable unit, the or each joining unit being in the inactive state when each bidirectional motor member is being driven in one of its directions of rotation. The possibility for the one or more motor members of at least one of the drivers to rotate in two directions of rotation makes it possible in certain conditions to bring one or more sheet materials from the second storage zone, where the one or more sheet materials which have been joined at least once are stored, to the first storage zone. As a result, the operator no longer needs to move between the first storage zone and the second storage zone at all as was the case in the prior art, since the visual inspection can be done from the first storage zone without the operator needing to move from this first storage zone, where the controls for the various adjustments of the machine are generally disposed. The operator can then visually inspect the quality of the one or more joins from the first storage zone without needing to move. This results in a saving on time for and less strain on the operator. The possibility of deactivating the one or more joining units makes it possible to move the one or more sheet materials that has or have already undergone at least one joining operation from the second storage zone to the first storage zone in good conditions, which is to say without this already assembled sheet material or these already assembled sheet materials undergoing a new joining operation.

According to an advantageous embodiment of the invention, the machine comprises a first operating mode referred to as test mode and a second operating mode referred to as production mode, said operating modes being selectively activatable. In production mode, each bidirectional motor member of the or each driver is moved in a single direction of rotation. This results in an increased production rate.

In one embodiment of the invention, the control unit is configured to, when the test mode is activated, make the or each bidirectional motor member of the driver or of at least one of the drivers rotate in a first direction of rotation corresponding to a movement of the one or more sheet materials from the first storage zone to the second storage zone and in a second direction of rotation corresponding to a movement of the one or more sheet materials from the second storage zone to the first storage zone and each joining unit is in the inactive state when the or each bidirectional motor member is driven in the second direction of rotation. The second storage zone disposed downstream of the joining station is the zone for storing the one or more sheet materials coming from the joining station. In this second storage zone, each sheet material has undergone at least one joining operation. The first storage zone contains at least sheet materials which have yet to be joined at least once. One or more sheet materials that have undergone at least one joining operation from the second storage zone can be brought into this first storage zone for generally visual quality control of the join.

According to one embodiment of the invention, the control unit is configured to, the production mode is activated, make each bidirectional motor member of the driver or of at least one of the drivers rotate in a single direction of rotation corresponding to a movement of the one or more sheet materials from the first storage zone to the second storage zone and each joining unit is in the active state.

According to one embodiment of the invention, the machine comprises a manually actuated test validation/invalidation system and the control unit is configured to control each bidirectional motor member of the driver or of at least one of the drivers and the or each joining unit in accordance with an operating cycle on the basis of the actuation of the test validation/invalidation system.

According to one embodiment of the invention, when the test mode is activated, the control unit is configured to control each bidirectional motor member of the driver or of at least one of the drivers and the or each joining unit in accordance with an operating cycle comprising a first phase during which each bidirectional motor member of the driver or of at least one of the drivers is being moved in a first direction of rotation corresponding to a movement of the one or more sheet materials from the first storage zone to the second storage zone and the or each joining unit is in the active state, and a second phase during which each bidirectional motor member of the driver or of at least one of the drivers is being moved in a second direction of rotation corresponding to a movement of the one or more sheet materials from the second storage zone to the first storage zone and the or each joining unit is in the inactive state, said operating cycle comprising, when the test validation/invalidation system has been actuated in the sense of validating the test, a third phase during which each bidirectional motor member of the driver or of at least one of the drivers is being moved in a first direction of rotation corresponding to a movement of the one or more sheet materials from the first storage zone to the second storage zone and the or each joining unit is in the inactive state. As a result, at the end of the second phase, the operator visually inspects the one or more joins. If the one or more joins are compliant, the operator actuates the test validation/invalidation system in the sense of validating the test. This actuation of the test validation/invalidation system in the sense of validating the test makes it possible to trigger a third phase during which each bidirectional motor member of the driver or of at least one of the drivers is being moved in a first direction of rotation corresponding to a movement of the one or more sheet materials from the first storage zone to the second storage zone and the or each joining unit is in the inactive state. This third phase makes it possible to bring the one or more sheet materials that have been assembled, which is to say have undergone at least one joining operation and have been visually inspected, into the second storage zone. A mass production can then be initiated. Conversely, if the at least one join is not compliant, the operator actuates the test validation/invalidation system in the sense of invalidating the test. This actuation of the test validation/invalidation system in the sense of invalidating the test makes it possible, after possible adjustments of the machine, to trigger the first phase of a new operating cycle. These operating cycles comprising the first and second phases may be repeated as many times as necessary until the one or more joins are deemed to be correct by the operator. These operating cycles may be repeated without the operator needing to move between the first and second storage zones. This results in a saving on time.

According to one embodiment of the invention, when the test mode is activated and when the test validation/invalidation system has been actuated in the sense of validating the test, the control unit is configured to command activation of the production mode at the end of the third phase. The machine can thus automatically switch over to production mode at the end of the third phase. When the test mode is activated and when the test validation/invalidation system has been actuated in the sense of invalidating the test, the control unit is configured to command a new operating cycle at the end of the second phase. The operator may thus immediately perform a new test after having moved away the one or more non-compliant sheet materials that are disposed in the first storage zone and have come from the second storage zone.

According to one embodiment of the invention, the machine comprises at least one sheet material detector preferably disposed in at least one of the storage zones and the control unit is configured to command the passage of the operating cycle from one phase to the next at least on the basis of the data supplied by said at least one sheet material detector.

According to one embodiment of the invention, the guide path comprises at least one surface for transporting sheet material and at least one portion of the transporting surface is defined by at least one portion of the drivers. This transporting surface is generally a mobile planar surface.

According to one embodiment of the invention, at least one of the drivers comprises at least two endless transmission members each associated with a bidirectional motor member, said endless transmission members being mounted movably between a position away from one another and a position closer to one another in which they define a zone between them for clamping sheet material. In a variant, at least one of the drivers comprises at least one endless transmission member associated with a bidirectional motor member and at least one rolling member such as a roller, said endless transmission member and said at least one rolling member being mounted movably between a position away from one another and a position closer to one another in which they define a zone between them for clamping sheet material.

According to one embodiment of the invention, for the driver or at least one of the drivers, when the test mode is activated and when the at least one rotary motor member of said driver is being rotated through a predetermined angular travel in a second direction of rotation corresponding to a movement of sheet material from the second storage zone to the first storage zone, said angular travel is divided into a first portion and a second portion, and the endless transmission members of said driver are in the position closer to one another through the first portion of the angular travel of said at least one rotary motor member and in the position away from one another through the second portion of the angular travel. This disposition makes it possible to avoid any risk of injury to an operator who is in the first storage zone caused by the one or more sheet materials coming from the second storage zone and moved by the one or more drivers. In a variant, for the driver or at least one of the drivers, when the test mode is activated and when the at least one rotary motor member of said driver is being rotated through a predetermined angular travel in a second direction of rotation corresponding to a movement of sheet material from the second storage zone to the first storage zone, said angular travel is divided into a first portion and a second portion, and the endless transmission member and the at least one rolling member of said driver are in the position closer to one another through the first portion of the angular travel of said at least one rotary motor member and in the position away from one another through the second portion of the angular travel.

According to one embodiment of the invention, at least one of the activatable/deactivatable joining units is a joining unit which is mounted movably in a direction referred to as vertical direction which is transverse to the longitudinal direction of the guide path between at least two positions, one of the positions corresponding to the inactive state of the joining unit and the other one of the positions corresponding to the active state of the joining unit.

According to one embodiment of the invention, at least one of the activatable/deactivatable joining units comprises a sideways U-shaped guide part with at least one flange and the adhesive bonding and/or stapling device is borne by said guide part.

According to one embodiment of the invention, each lateral bounding means of the guide path is formed by at least one guide element, said lateral bounding means are mounted so as to be able to be moved closer to or further away from one another in order to vary the width of the guide path and the or each driver and the or each joining unit are disposed between said lateral bounding means along at least one line transverse to the longitudinal direction of the guide path.

The invention also relates to a method for joining sheet material, preferably cardboard, using a machine comprising a sheet material joining station, disposed between two sheet material storage zones, and a control unit, said joining station forming a guide path for sheet material extending between the zones for storing sheet materials and extending longitudinally from one of the storage zones, referred to as first storage zone, to the other storage zone, referred to as second storage zone, said guide path comprising two lateral bounding means and, disposed between said lateral bounding means, at least one driver for sheet material and at least one unit for joining said sheet material, each joining unit comprising at least one adhesive bonding and/or stapling device, each driver comprising at least one motor member, characterized in that the motor member or at least one of the motor members of the driver or of at least one of the drivers is a bidirectional motor member for moving sheet material from one of the storage zones toward the other storage zone and vice versa, and the or each joining unit is an activatable/deactivatable unit, the or each joining unit being in the inactive state when each bidirectional motor member is being driven in one of its directions of rotation, and the machine comprises a first operating mode referred to as test mode and a second operating mode referred to as production mode, said operating modes being selectively activatable, said method comprising, when the test mode is activated, at least one step of making each bidirectional motor member of the driver or of at least one of the drivers rotate in a first direction of rotation corresponding to a movement of sheet material from the first storage zone to the second storage zone, during which each joining unit is in the active state, and a step of making each bidirectional motor member of the driver or of at least one of the drivers rotate in a second direction of rotation corresponding to a movement of the sheet materials from the second storage zone to the first storage zone, during which each joining unit is in the inactive state.

The method above may also comprise, for a machine comprising a manually actuated test validation/invalidation system, after the step of making each bidirectional motor member of the driver or of at least one of the drivers rotate in a second direction of rotation corresponding to a movement of sheet material from the second storage zone to the first storage zone during which each joining unit is in the inactive state, a step of actuating the test validation/invalidation system in the sense of validating a test followed by a step during which each bidirectional motor member of the or of at least one of the drivers is being rotated in a first direction of rotation corresponding to a movement of sheet material from the first storage zone to the second storage zone and during which the or each joining unit is in the inactive state.

BRIEF DESCRIPTION OF THE DRAWINGS

The invention will be clearly understood on reading the following description of exemplary embodiments, with reference to the appended drawings in which:

FIG. 1 shows a schematic view of a machine in accordance with the invention;

FIG. 2 shows a partial view of a machine with sheet materials coming from the first storage zone inserted in the joining station and with the sheet materials being driven toward the second storage zone, the joining units being in the active state;

FIG. 3 shows a partial view of a machine with sheet materials that have undergone at least one joining operation being positioned in the second storage zone;

FIG. 4 shows a partial view of a machine with sheet materials that have been assembled, which is to say have undergone at least one joining operation, being positioned in the second storage zone while the joining units are passing into the inactive state;

FIG. 5 shows a partial view of a machine with assembled sheet materials being positioned in the second storage zone and the joining units in the deactivated state, and with said assembled sheet materials being driven toward the joining station to be returned to the first storage zone;

FIG. 6 shows a partial view of a machine with assembled sheet materials being positioned in the first storage zone, and with said assembled sheet materials being driven toward the joining station to be returned to the second storage zone, said joining units being in the inactive state;

FIG. 7 shows a partial view of a machine with said assembled sheet materials being driven toward the second storage zone to be returned to the second storage zone, said joining units being in the course of passing from the inactive state to the active state;

FIG. 8 shows a partial schematic view of a driver;

FIG. 9 shows a partial schematic view of two joining units; and

FIG. 10 shows a partial schematic view, in section, of sheet materials in the course of being joined with a schematic representation of the joining units.

DETAILED DESCRIPTION

As mentioned above, the invention relates to a machine 1 for joining one or more sheet materials 20, such as sheets of cardboard, like in the example shown in which the sheets can be folded and scored beforehand, if required. The machine 1 shown serves for joining a sheet of cardboard at, for example, the edges of said sheet of cardboard or multiple sheets of cardboard, in the present case two sheets of cardboard, folded so as to form, after assembly, a belt which can make up at least the side walls of a parallelepipedal box.

The machine 1 comprises, as illustrated in FIG. 1, a sheet material joining station 2 disposed between two sheet material storage zones 3 and 4 and a control unit 5. The joining station 2 extends between the storage zones 3 and 4 and forms a zone of communication between said storage zones 3 and 4. This joining zone 2 forms a guide path 6 extending between the storage zones 3 and 4 and connecting said storage zones 3 and 4 to each other. This guide path 6 extends longitudinally, which is to say along its longitudinal axis, from one of the storage zones, referred to as first storage zone 3, toward the other storage zone, referred to as second storage zone 4. The first storage zone 3 is at least one storage zone for sheet materials which have not yet undergone at least one joining operation, whereas the second storage zone 4 is a storage zone for sheet materials which have undergone at least one joining operation.

In the examples shown, the first storage zone 3 is simply defined by a substantially horizontal planar surface on which at least the sheet materials 20 that are to undergo at least one joining operation can be stored flat. The second storage zone 4 is in this case realized in the form of a belt conveyor on which the one or more sheet materials coming from the joining station are disposed. This belt conveyor defines a transporting surface with two directions of movement, one toward the joining station and the other away from the joining station. The direction of movement of the transporting surface of the belt conveyor is parallel to the longitudinal axis of the guide path 6 defined by the joining station 2.

The guide path 6 of the joining station 2 comprises two lateral bounding means 7 and, disposed between said lateral bounding means 7, at least one driver 8 for sheet material 20 and at least one joining unit 9 for joining sheet material 20 by adhesive bonding and/or stapling.

In the examples shown, each lateral bounding means 7 of the guide path 6 is formed by a guide element taking the form of a part which is elongate along a direction parallel to the longitudinal axis of the guide path so as to form a shelf. These lateral bounding means 7 are mounted so as to be able to move closer to or away from one another in order to vary the width of the guide path 6. The or each driver 8 and the or each joining unit 9 are disposed between said lateral bounding means 7 along at least one line transverse to the longitudinal direction of the guide path 6. To allow such a movement of the lateral bounding means 7 closer to or away from one another, the lateral bounding means 7 are mounted on a rail transverse to the longitudinal axis of the guide path 6 and are equipped with a motor which can be controlled by the control unit 5 for automatic movement of the lateral bounding means 7 along the rail. Each joining unit 9, for its part, comprises at least one adhesive bonding and/or stapling device 10. In the examples shown, two joining units 9 are provided. At least one, preferably each of the joining units 9 is an activatable/deactivatable joining unit 9. This joining unit 9 is mounted movably in a direction referred to as vertical direction, which is transverse to the longitudinal direction of the guide path 6 between at least two positions, one of the positions corresponding to the inactive state of the joining unit 9 and the other one of the positions corresponding to the active state of the joining unit. In practice, at least one, preferably each of the activatable/deactivatable joining units 9 comprises a sideways U-shaped guide part 11 with at least one flange and the adhesive bonding and/or stapling device 10 is borne by said guide part 11. As illustrated in FIG. 10, the sideways U-shaped guide part 11 of one of the joining units faces toward a lateral bounding means 7 and the sideways U-shaped guide part 11 of the other one of the joining units faces toward the other lateral bounding means 7. As a result, the backs of the U's of the sideways U-shaped guide parts 11 face one another. Each sideways U has a flange referred to as vertical flange which is perpendicular to one of the legs of the U and is disposed at the end of said leg. The joining units are disposed at different heights and one of the joining units is referred to as lower joining unit whereas the other one of the joining units is referred to as upper joining unit. The flange of the sideways U of the lower joining unit is borne by the lower leg of the U. The flange of the sideways U of the upper joining unit is borne by the upper leg of the sideways U. Each sheet material is inserted by way of one of its edges into the space between the legs of one of the sideways U's and bears by way of its other edge outside the U against one of the legs of the U at the other sideways U. This mounting is a conventional mounting in the case of such joining units 9 which have a basic architecture that is known per se.

The adhesive bonding/stapling device 10 with which each joining unit is equipped makes it possible, in this position, to assemble one or more sheet materials 20 at each guide part 11 by stapling and/or adhesive bonding. Again, each adhesive bonding and/or stapling device 10 is well known to those skilled in this art and can be conventionally formed of a stapling or adhesive bonding head.

In the inactive state of the joining units, corresponding to a position away from one another along a direction referred to as vertical direction which is transverse to the longitudinal direction of the guide path 6, the guide parts 11 of the joining units 9 are disposed outside the trajectory followed by the one or more sheet materials 20 in the joining station for passing from the first storage zone 3 to the second storage zone 4 or vice versa.

In the active state of the joining units, corresponding to a position closer to one another along a direction referred to as vertical direction which is transverse to the longitudinal direction of the guide path 6, the guide parts 11 of the joining units 9 are disposed on the trajectory followed by the one or more sheet materials 20 in the joining station for passing from the first storage zone 3 to the second storage zone 4. This trajectory of the one or more sheet materials 20 in the joining station is defined by means of the one or more drivers 8. Specifically, the guide path 6 comprises at least one surface 14 for transporting the one or more sheet materials 20 and at least one portion of the transporting surface 14 is defined by at least one portion of the drivers 8. This transporting surface 14 defines a plane referred to as horizontal plane which is parallel to the longitudinal direction of the guide path 6. The joining units 9 are disposed one above the other below this transporting surface 14 in the inactive state.

Each driver 8, for its part, comprises one or more motor members 81. The motor member or at least one of the motor members 81 of the or of at least one of the drivers, preferably of each of the drivers, is a bidirectional motor member for moving the one or more sheet materials 20 from the first storage zone toward the second storage zone and vice versa, which is to say from the second storage zone to the first storage zone.

In the examples shown, at least one, in this case each driver 8 comprises two endless transmission members 82 each formed by a belt. Each transmission member 82 is associated with a bidirectional motor member 81. The transmission members 82 are mounted movably between a position away from one another and a position closer to one another in which they define a zone between them for clamping sheet material 20.

The transporting surface 14 mentioned above is defined by at least one portion of the drivers 8. Thus, in the examples shown, with the endless transmission members 82 being endless belts, at least the upper strand of the lower belt forms the surface 14 for transporting the one or more sheet materials of the guide path allowing the one or more sheet materials to be moved inside the joining station from one storage zone to the other. The endless transmission members 82 of a driver 8 are mounted so as to be able to move closer to or away from one another. To this end, in the example shown in FIG. 8, each endless transmission member 82 is mounted on a rail, referred to as horizontal rail, which extends transversely to the longitudinal direction of the guide path 6 and the rails can be moved parallel to themselves closer to or away from one another.

Each transmission member 82 is also movable axially along the rail by means of a preferably motorized drive system in order to make it possible to adjust the position of the transmission members 82 along the rail.

The or each joining unit 9 is in the inactive state when the motor members 81 of a driver are driven in one of their directions of rotation. In particular, the or each joining unit 9 is in the inactive state when the one or more motor members of a driver is driven in the direction of rotation for moving the one or more sheet materials 20 from the second storage zone 4 corresponding to the zone 4 for storing one or more sheet materials in the assembled state, which is to say that have undergone at least one joining operation, to the first storage zone 3. As a result, when the one or more sheet materials 20 are being moved from the second storage zone 4 to the first storage zone 3, this sheet material or these sheet materials 20 cannot be the object of at least one joining operation by means of the one or more joining units 9.

In the example shown, the machine 1 comprises a first operating mode, referred to as test mode, and a second operating mode, referred to as production mode. These operating modes are selectively activatable. In general, the test mode is the default mode on startup of the machine.

As mentioned above, the machine 1 comprises a control unit 5. Said control unit takes the form of an electronic computer system which comprises, for example, a microprocessor and a working memory. According to a particular aspect, the control unit may take the form of a programmable logic controller.

In other words, the functions and steps described can be implemented in the form of a computer program or via hardware components (for example programmable gate arrays). In particular, the functions and steps performed by the control unit or its modules can be carried out by sets of instructions or computer modules implemented in a processor or controller or be carried out by dedicated electronic components or components of the field programmable gate array type (or FPGA), or of the application-specific integrated circuit type (ASIC). It is also possible to combine computer parts and electronic parts.

When it is specified that the unit or means or modules of said unit are configured to carry out a given operation, this means that the unit comprises computer instructions and the corresponding execution means which make it possible to carry out said operation and/or that the unit comprises corresponding electronic components.

The control unit 5 is configured to, when the test mode is activated, make each bidirectional motor member 81 of the driver or of at least one of the drivers 8, preferably of each of the drivers 8, rotate in a first direction of rotation corresponding to a movement of the one or more sheet materials 20 from the first storage zone 3 to the second storage zone 4 and in a second direction of rotation corresponding to a movement of the one or more sheet materials 20 from the second storage zone 4 to the first storage zone 3. Each joining unit 9 is in the inactive state when the one or more bidirectional motor members 81 are being driven in the second direction of rotation.

The control unit 5 is also configured to, when the production mode is activated, make the one or more bidirectional motor members 81 of the driver or of at least one of the drivers 8 rotate in a single direction of rotation corresponding to a movement of the one or more sheet materials 20 from the first storage zone 3 to the second storage zone 4 and each joining unit is in the active state in this operating mode.

The machine 1 also comprises a manually actuated test validation/invalidation system 13. This manually actuated test validation/invalidation system 13. is disposed in the first storage zone 3, as illustrated in FIG. 1. This test validation/invalidation system 13 may be formed by two buttons disposed on a casing forming a man-machine interface. One of the buttons corresponds to validating the test and the other button to invalidating the test. The control unit 5 is configured to command the one or more motor members 81 of the driver or of at least one of the drivers, preferably of each of the drivers 8, and the or each joining unit 9 in accordance with an operating cycle on the basis of the actuation of the test validation/invalidation system 13. Thus, when the test mode is activated, the control unit 5 is configured to command the one or more bidirectional motor members 81 of the driver or of at least one, preferably each of the drivers 8 and the or each joining unit 9 in accordance with an operating cycle comprising a first phase during which the one or more bidirectional motor members of at least one, preferably each of the drivers is being driven in a first direction of rotation corresponding to the movement of the one or more sheet materials 20 from the first storage zone to the second storage zone and the or each joining unit 9 is in the active state.

Thus, during this first phase, the one or more sheet materials can undergo at least one joining operation for joining them to one another, as illustrated in FIGS. 2 and 3. The operating cycle comprises a second phase during which the or each bidirectional motor member 81 of the driver or of at least one, preferably each of the drivers 8 is being driven in a second direction of rotation corresponding to a movement of the one or more sheet materials 20 from the second storage zone 4 to the first storage zone 3 and the or each joining unit 9 is in the inactive state. This second phase is illustrated in FIGS. 4 and 5. The joining units 9 are moved away from one another for their passage into the inactive state and the belt conveyor of the second storage zone 4 and the endless transmission members 82 of at least one of the drivers cause the sheet materials 20 to move from the second storage zone 4 to the first storage zone 3. As a result, the one or more sheet materials 20 undergoing at least one joining operation return to the first storage zone 3 where the operator is. During this second phase, the one or more bidirectional motor members 81 of the driver or of at least one of the drivers, preferably each of the drivers, are rotated through a predetermined angular travel in a second direction of rotation corresponding to a movement of the one or more sheet materials 20 from the second storage zone 4 to the first storage zone 3.

The angular travel is divided into a first portion and a second portion and the endless transmission members 82 of said driver 8 are in a position closer to one another through the first portion of the angular travel of said rotary motor member 81 and in a position away from one another through the second portion of the angular travel such that, through the second portion of the angular travel, they no longer move the one or more sheet materials 20. This disposition makes it possible for, at the end of travel of the one or more sheet materials, which is to say as they approach the first storage zone, the one or more sheet materials to be thrust less forcefully toward the operator who is at the first storage zone, as illustrated in FIG. 1, as otherwise there would be the risk of injury. The operator then visually inspects the one or more joins. If the operator is satisfied on completion of the visual inspection, they can actuate the test validation/invalidation system 13 in the sense of validating the test. All the operator needs to do for this is press on the test validation button. In this case, the operating cycle comprises a third phase during which the one or more bidirectional motor members 81 of the driver or of at least one of the drivers, preferably each of the drivers 8, is driven in a first direction of rotation corresponding to a movement of the one or more sheet materials 20 from the first storage zone 3 to the second storage zone 4 and the or each joining unit 9 is in the inactive state. The one or more sheet materials 20 that have undergone at least one joining operation are thus brought into the second storage zone, as illustrated in FIG. 7, to then be discharged or not discharged from this second storage zone.

When the test mode is activated and when the test validation/invalidation system 13 has been actuated in the sense of validating the test, the control unit 5 is configured to command activation of the production mode at the end of the third phase. If the operator is not satisfied with the quality of the one or more joins on completion of the visual inspection, they can actuate the test validation/invalidation system 13 in the sense of invalidating the test. All the operator needs to do for this is press on the test invalidation button. In parallel, the operator moves the one or more sheet materials that have just undergone at least one joining operation and are not compliant away from the first storage zone. If required, the operator can make adjustments at the joining station. The operating cycle restarts at phase no. 1 and a new test is initiated until the operator finishes by validating the test.

In order that, for example, the direction of the motor members 81 of the drivers is reversed at the desired moment on the basis of the movement of the one or more sheet materials, the machine comprises at least one detector 12 for detecting sheet material disposed preferably in at least one of the storage zones. The control unit 5 is configured to command the passage of the operating cycle from one phase to the next at least on the basis of the data supplied by said at least one sheet material detector 12. This sheet material detector 12 can take very many forms and may, for example, be formed by a sensor, an encoder, a time counter or the like.

In practice, a single sensor is disposed in the second storage zone 4.

It will be understood that the operating cycle described above means the operator does not need to move to inspect a joining operation. This results in a saving on time for and less strain on the operator.

In summary, with the operator being at the first storage zone, as illustrated in FIG. 1, and the operator having input the dimensions of the sheet materials into the man-machine interface, it is assumed that the machine has adjusted a position of the drivers, of the lateral bounding means and of the joining units with regard to the data input. The test mode is automatically activated.

The joining method described above then comprises:

- a step of manually or automatically positioning one or more, in the present case for example two sheet materials stored in the first storage zone in the guide path 6 of the joining station,
- a step of joining the one or more sheet materials using the one or more joining units of the joining station in parallel with using the one or more drivers 8 to bring the one or more sheet materials 20 into the second storage zone,
- a step of reversing the direction of the bidirectional motor members of the drivers and inactivating the joining units after returning the one or more sheet materials to the first storage zone. During this returning phase, the lateral bounding means can be moved away from one another. In this first storage zone, the method comprises either a step of validating the test after returning the one or more sheet materials to the second storage zone, or a step of invalidating the test after initiating a new test which restarts the procedure described above after possibly making adjustments to the machine.

The invention claimed is:

1. A machine for joining sheet material, including cardboard, said machine comprising:

- a sheet material joining station, disposed between first and second sheet material storage zones, and a control unit, said joining station forming a guide path for sheet material extending between the zones for storing sheet materials and extending longitudinally from the first storage zone storing said sheet material prior to joining, to the second storage zone for storing said sheet material that has already been joined, said guide path comprising two lateral bounding means and, disposed between said lateral bounding means, at least one driver for sheet materials and at least one unit for joining said sheet materials, each joining unit comprising at least one adhesive bonding and/or stapling device, each driver comprising at least one motor member,
- wherein the at least one of the motor member of the at least one driver is a bidirectional motor member for moving the one or more sheet materials from one of the storage zones toward the other storage zone and vice versa, and in that the at least one joining unit is an activatable/deactivatable unit, the at least one joining unit being in the inactive state when said at least one bidirectional motor member is driven in a directions of rotation moving the sheet material that has already been joined by said at least one joining unit from said second storage zone to said first storage zone.

2. The machine for joining sheet material as claimed in claim 1, wherein the machine comprises a first operating mode referred to as test mode and a second operating mode referred to as production mode, said operating modes being selectively activatable.

3. The machine for joining sheet material as claimed in claim 2, wherein the control unit is configured to, when the test mode is activated, make the or each bidirectional motor member of the driver or of at least one of the drivers rotate in a first direction of rotation corresponding to a movement of the one or more sheet materials from the first storage zone to the second storage zone and in a second direction of rotation corresponding to a movement of the one or more sheet materials from the second storage zone to the first storage zone and in that each joining unit is in the inactive state when the or each bidirectional motor member is being driven in the second direction of rotation.

4. The machine for joining sheet material as claimed in claim 2, wherein the control unit is configured to, when the production mode is activated, make each bidirectional motor member of the driver or of at least one of the drivers rotate in a single direction of rotation corresponding to a movement of the one or more sheet materials from the first storage zone to the second storage zone and in that each joining unit is in the active state.

5. The machine for joining sheet material as claimed in claim 2, wherein the machine comprises a manually actuated test validation/invalidation system and in that the control unit is configured to control each bidirectional motor member of the driver or of at least one of the drivers and the or each joining unit in accordance with an operating cycle on the basis of the actuation of the test validation/invalidation system.

6. The machine for joining sheet material, as claimed in claim 5, wherein when the test mode is activated, the control unit is configured to control each bidirectional motor member of the driver or of at least one of the drivers and the or each joining unit in accordance with an operating cycle comprising a first phase during which each bidirectional motor member of the driver or of at least one of the drivers is being moved in a first direction of rotation corresponding to a movement of the one or more sheet materials from the first storage zone to the second storage zone and the or each joining unit is in the active state, and a second phase during which each bidirectional motor member of the driver or of at least one of the drivers is being moved in a second direction of rotation corresponding to a movement of the one or more sheet materials from the second storage zone to the first storage zone and the or each joining unit is in the inactive state, said operating cycle comprising, when the test validation/invalidation system has been actuated in the sense of validating the test, a third phase during which each bidirectional motor member of the driver or of at least one of the drivers is being moved in a first direction of rotation corresponding to a movement of the one or more sheet materials from the first storage zone to the second storage zone and the or each joining unit is in the inactive state.

7. The machine for joining sheet material as claimed in claim 6, wherein when the test mode is activated and when the test validation/invalidation system has been actuated in the sense of validating the test, the control unit is configured to command activation of the production mode at the end of the third phase.

8. The machine for joining sheet material as claimed in claim 6, wherein the machine comprises at least one sheet material detector, possibly disposed in at least one of the storage zones, and in that the control unit is configured to command the passage of the operating cycle from one phase to the next at least on the basis of the data supplied by said at least one sheet material detector.

9. The machine for joining sheet material as claimed in claim 1, wherein the guide path comprises at least one surface for transporting sheet material and in that at least one portion of the transporting surface is defined by at least one portion of the drivers.

10. The machine for joining sheet material as claimed in claim 1, wherein at least one of the drivers comprises at least two endless transmission members each associated with a bidirectional motor member, said endless transmission members being mounted movably between a position away from one another and a position closer to one another in which they define a zone between them for clamping sheet material.

11. The machine for joining sheet material as claimed in claim 10 wherein the machine comprises a first operating mode referred to as test mode and a second operating mode referred to as production mode, said operating modes being selectively activatable, and wherein for the driver or at least one of the drivers, when the test mode is activated and when the at least one rotary motor member of said driver is being rotated through a predetermined angular travel in a second direction of rotation corresponding to a movement of sheet material from the second storage zone to the first storage zone, said angular travel is divided into a first portion and a second portion, and in that the endless transmission members of said driver are in the position closer to one another through the first portion of the angular travel of said at least one rotary motor member and in the position away from one another through the second portion of the angular travel.

12. The machine for joining sheet material as claimed in claim 1, wherein at least one of the activatable/deactivatable joining units is a joining unit which is mounted movably in a direction referred to as vertical direction which is transverse to the longitudinal direction of the guide path between at least two positions, one of the positions corresponding to the inactive state of the joining unit and the other one of the positions corresponding to the active state of the joining unit.

13. The machine for joining sheet material as claimed in claim 1, wherein at least one of the activatable/deactivatable joining units comprises a sideways U-shaped guide part with at least one flange and in that the adhesive bonding and/or stapling device is borne by said guide part.

14. The machine for joining sheet material as claimed in claim 1, wherein each lateral bounding means of the guide path is formed by at least one guide element, in that said lateral bounding means are mounted so as to be able to be moved closer to or further away from one another in order to vary the width of the guide path and in that the or each driver and the or each joining unit are disposed between said lateral bounding means along at least one line transverse to the longitudinal direction of the guide path.

* * * * *